(12) United States Patent
Olson et al.

(10) Patent No.: US 7,039,136 B2
(45) Date of Patent: May 2, 2006

(54) INTERFERENCE CANCELLATION IN A SIGNAL

(75) Inventors: Eric S. Olson, Boulder, CO (US); John K. Thomas, Erie, CO (US); Wolfgang Kober, Aurora, CO (US); Robert K. Krumvieda, Westminster, CO (US)

(73) Assignee: TensorComm, Inc., Westminster, CO (US)

( * ) Notice: Subject to any disclaimer, the term of this patent is extended or adjusted under 35 U.S.C. 154(b) by 274 days.

(21) Appl. No.: 10/763,346

(22) Filed: Jan. 23, 2004

(65) Prior Publication Data

US 2004/0151235 A1  Aug. 5, 2004

Related U.S. Application Data

(63) Continuation-in-part of application No. 09/988,218, filed on Nov. 19, 2001, now Pat. No. 6,711,219.

(51) Int. Cl.
  *H03D 1/04* (2006.01)
(52) U.S. Cl. ...................................................... 375/346
(58) Field of Classification Search ................ 375/346, 375/316, 278, 267, 347, 299; 370/342, 335, 370/320; 455/63, 65
See application file for complete search history.

(56) References Cited

U.S. PATENT DOCUMENTS

| | | |
|---|---|---|
| 5,615,209 A | 3/1997 | Bottomley |
| 5,787,130 A | 7/1998 | Kotzin et al. |
| 5,872,540 A | 2/1999 | Casabona et al. |
| 5,872,776 A | 2/1999 | Yang |
| 5,930,229 A | 7/1999 | Yoshida et al. |
| 5,953,369 A | 9/1999 | Suzuki |
| 5,978,413 A | 11/1999 | Bender |
| 5,995,499 A | 11/1999 | Hottinen et al. |
| 6,002,727 A | 12/1999 | Uesugi |
| 6,014,373 A | 1/2000 | Schilling et al. |
| 6,018,317 A | 1/2000 | Dogan et al. |

(Continued)

FOREIGN PATENT DOCUMENTS

DE  4201439  7/1993

(Continued)

OTHER PUBLICATIONS

Iltis, Multiuser Detection of Quasisynchronous CDMA Signals Using Linear Decorrelators, IEEE Transactions on Communications, Nov. 1996, vol. 44, No. 11.

(Continued)

*Primary Examiner*—Khai Tran
(74) *Attorney, Agent, or Firm*—Steven J. Shattil

(57) ABSTRACT

The present invention provides systems and methods for decreasing interference in a selected coded signal. The system includes a matrix generator for generating a matrix. The matrix may comprise vectors, the elements of which are formed from components of the interference. The interference may exist in the form of co-channel and/or cross channel interference, such as that found in CDMA telephony. The components of this interference may, therefore, be code components of the interference that are used to fill elements of the vectors. Each element of a vector may represent a code component of an interfering coded signal. A processor uses the matrix to substantially remove the interference from the selected coded signal. For example, the processor may generate a projection operator that projects the coded signal substantially orthogonal to the interference such that the impact of interference on the selected coded signal is substantially reduced.

39 Claims, 9 Drawing Sheets

U.S. PATENT DOCUMENTS

| | | | |
|---|---|---|---|
| 6,032,056 A | 2/2000 | Reudink | |
| 6,078,611 A | 6/2000 | La Rosa et al. | |
| 6,088,383 A | 7/2000 | Suzuki et al. | |
| 6,115,409 A | 9/2000 | Upadhyay et al. | |
| 6,127,973 A | 10/2000 | Choi et al. | |
| 6,131,013 A | 10/2000 | Bergstrom et al. | |
| 6,137,788 A | 10/2000 | Sawahashi et al. | |
| 6,141,332 A | 10/2000 | Lavean | |
| 6,154,443 A | 11/2000 | Huang et al. | |
| 6,157,685 A | 12/2000 | Tanaka et al. | |
| 6,157,847 A | 12/2000 | Buehrer et al. | |
| 6,166,690 A | 12/2000 | Lin et al. | |
| 6,172,969 B1 | 1/2001 | Kawakami et al. | |
| 6,175,587 B1 | 1/2001 | Madhow et al. | |
| 6,192,067 B1 | 2/2001 | Toda et al. | |
| 6,201,799 B1 | 3/2001 | Huang et al. | |
| 6,215,812 B1 | 4/2001 | Young et al. | |
| 6,222,828 B1 | 4/2001 | Ohlson et al. | |
| 6,230,180 B1 | 5/2001 | Mohamed | |
| 6,233,229 B1 | 5/2001 | Ranta et al. | |
| 6,256,336 B1 | 7/2001 | Rademacher et al. | |
| 6,259,688 B1 | 7/2001 | Schilling et al. | |
| 6,269,075 B1 | 7/2001 | Tran | |
| 6,278,726 B1 | 8/2001 | Mesecher et al. | |
| 6,282,231 B1 | 8/2001 | Norman et al. | |
| 6,282,233 B1 | 8/2001 | Yoshida | |
| 6,285,316 B1 | 9/2001 | Nir et al. | |
| 6,304,618 B1 | 10/2001 | Hafeez et al. | |
| 6,317,466 B1* | 11/2001 | Foschini et al. | 375/267 |
| 6,324,159 B1 | 11/2001 | Mennekens et al. | |
| 6,377,636 B1 | 4/2002 | Paulraj et al. | |
| 6,430,216 B1 | 8/2002 | Kober et al. | |
| 6,442,130 B1 | 8/2002 | Jones, IV et al. | |
| 6,459,693 B1 | 10/2002 | Park et al. | |
| 6,567,462 B1 | 5/2003 | Brunner et al. | |
| 6,574,270 B1 | 6/2003 | Madkour et al. | |
| 6,590,888 B1 | 7/2003 | Ohshima | |
| 2001/0003443 A1 | 6/2001 | Velazquez et al. | |
| 2001/0020912 A1 | 9/2001 | Naruse et al. | |
| 2001/0021646 A1 | 9/2001 | Antonucci et al. | |
| 2001/0046266 A1 | 11/2001 | Rakib et al. | |
| 2002/0001299 A1 | 1/2002 | Petch et al. | |
| 2002/0012386 A1* | 1/2002 | Stanbhag | 375/146 |
| 2002/0172173 A1 | 11/2002 | Schilling et al. | |
| 2003/0053526 A1 | 3/2003 | Reznik | |
| 2005/0031060 A1* | 2/2005 | Thomas et al. | 375/346 |

FOREIGN PATENT DOCUMENTS

| | | |
|---|---|---|
| DE | 4326843 A1 | 2/1995 |
| DE | 4343959 A1 | 6/1995 |
| EP | 0558910 A1 | 9/1993 |
| EP | 0610989 A2 | 8/1994 |
| GB | 2280575 A | 2/1995 |
| JP | 7-74687 | 3/1995 |
| JP | 2000-13360 A | 1/2000 |
| WO | WO 93/12590 | 6/1995 |

OTHER PUBLICATIONS

Rappaport, Wireless Communications—Principles & Practice, 1996, pp. 518-533, Prentice Hall, Upper Saddle River, NJ, US.

Scharf, et al., Matched Subspace Detectors, IEEE Transactions on Signal Proceesing, Aug. 1994, vol. 42, No. 8.

Price et al., A Communication Technique for Multipath Channels, Proceedings to the IRE, 1958, vol. 46, The Institute of Radio Engineers, New York, NY, US.

Zheng et al., On the Performance of Near-Far Resistant CDMA Detectors in the Presence of Synchronization Errors, IEEE Transactions on Communications, Dec. 1993, vol. 43, No. 1.

Schlegel et al., Coded Asynchronous CDMA and Its Efficient Detection, IEEE Transactions on Information Theory, Nov. 1998, vol. 44, No. 7.

Xie et al., A family of Suboptimum Detectors for Coherent Multiuser Communications, IEEE Journal on Selected Areas in Communications, May 1990, vol. 8, No. 4.

Viterbi, Very Low Rate Convolutional Codes for Maximum Theoretical Performance of Spread Spectrum Multiple-Access Channels, IEEE Journal on Selected Areas in Communications.

Viterbi, CDMA—Principles of Spread Spectrum Communication, 1995, pp. 11-75 and 179-233, Addison-Wesley, Reading, MA, US.

Verdu, Mimimum Probability of Error for Asynchronous Gaussian Multiple-Access Channels, IEEE Transactions on Information Theory, Jan. 1986, vol. IT-32, No. 1.

Kaplan, Understanding GPS—Principles and Applications, 1996, pp. 83-236, Artech House, Norwood, MA, US.

Scharf, Statistical Signal Proceesing—Detection, Estimation, and Time Series Analysis. 1990, pp. 23-75 and 103-178. Addison-Wesley. Reading, MA, US.

Stimson, Introduction to Airborne Radar 2nd edition, 1998, pp. 163-176 and 473-491, SciTech Publishing, Mendham, NJ, US.

Behrens et al., Signal Processing Applications of Oblique Projection Operators, IEEE Transactions on Signal Proceesing, Jun. 1994, vol. 42, No. 6.

Alexander et al., A Linear Receiver for Coded Multiuser CDMA, IEEE Transactions on Communications, May 1997, vol. 45, No. 5.

Schlegel et al., Multiuser Projection Receivers, IEEE Journal on Selected Areas in Communications, Oct. 1996, vol. 14, No. 8.

Halper et al., Digital-to-Analog Conversion by Pulse-Count Modulation Methods, IEEE Transactions on Instrumentation and Measurement, Aug. 1996, vol. 45, No. 4.

Ortega et al., Analog to Digital and Digital to Analog Conversion Based on Stochastic Logic, IEEE 0-7803-3026-9/95, 1995.

Frankel et al., High-performance photonic analogue digital converter, Electronic Letters, Dec. 4, 1997, vol. 33, No. 25.

Lin et al., Digital Filters for High Performance Audio Delta-sigma Analog-to-digital and Digital-to-analog Conversions, Proceedings of ICSP, Crystal Semiconductor Corporation.

Thomas, Thesis for the Doctor of Philosophy Degree, UMI Dissertation Services, Jun. 1996, Ann Arbor, MI, US.

Schlegel et al., Projection Receiver: A New Efficient Multi-User Detector, IEEE, 1995, 0-7803-2509-5/95.

Behrens, Subspace Signal Processing in Structured Noise, UMI Dissertation Services, Jun. 1990, Ann Arbor, MI, US.

Sofiene et al., Interference Subspace Rejection: A Framework for Multiuser Detection in Wideband CDMA, IEEE Journal on Selected Areas in Communications, Feb. 2002, vol. 20, No.

* cited by examiner

INTERFERENCE CANCELLATION IN A SIGNAL

CROSS REFERENCE TO RELATED APPLICATIONS

This application is a continuation-in-part of U.S. patent application Ser. No. 09/988,218 (filed Nov. 19, 2001), now U.S. Pat. No. 6,711,219, which is hereby incorporated by reference.

BACKGROUND

1. Field of the Invention

The invention generally relates to the field of communications. More specifically the invention is related to interference suppression for use in coded signal communications, such as Code Division Multiple Access ("CDMA") communications.

2. Discussion of the Related Art

Interference in communications obstructs the intended reception of a signal and is a persistent problem. Interference may exist in many forms. In CDMA communications, for example, interference is typically the result of receiving one or more unwanted signals simultaneously with a selected signal. These unwanted signals may be similar to that of the selected signal and may therefore disrupt the reception of the selected signal.

This disruption of the selected signal may corrupt data retrieval processes of a selected signal. As communication systems become more complex and as data rates and user numbers increase, the likelihood of signals interfering with one another increases. Such problems are typical in CDMA telephony systems.

In CDMA telephony, a communications system typically includes a plurality of "base stations" providing a coverage area within a geographic region. These base stations communicate with mobile telephones and/or other CDMA devices operating within the coverage area. To illustrate, a base station provides a coverage "cell" within the overall communication coverage area maintained by the communications system. While within a particular cell, a mobile telephone can communicate with the base station providing the coverage for that cell. As the mobile telephone moves to the cell of another base station, communications between the mobile telephone and the base station providing the initial cell coverage can be transferred via a "hand off" to the other base station.

Each base station within a CDMA telephony system uses coded signals to communicate with mobile telephones. For example, typical CDMA telephony systems use pseudorandom number (PN) spreading codes, occasionally referred to as "short codes," to encode data signals. These encoded data signals are transmitted to and from mobile telephones to convey digitized voice and/or other forms of communication. PN codes are known to those skilled in the art.

To encode the data signals, the base station applies a short code to the data at a rate that is faster than that of the data. For example, the short code is applied to the data such that there are multiple "chips" of the code for any given element of data. Such an application of the short code is commonly referred to as direct sequence spreading of the data. Chips and their associated chip rates are known to those skilled in the art.

Often, each base station is assigned a particular timing offset of the short code to differentiate between base stations. Mobile telephones may therefore determine the identity of a particular base station based on the timing offset of the short code. Additionally, the data signals are often further encoded with a unique "covering" code. Such covering codes provide "channelization" for a signal that increases the possibility of recovery of a selected signal. For example, data encoded with a covering code can further differentiate signals thereby improving detection and subsequent processing of a selected signal.

These covering codes are often used in CDMA telephony systems and typically include families of codes that are orthogonal (e.g., a Walsh code) or codes that have quasi-orthogonal functions ("QOF") that are substantially orthogonal. Orthogonal covering codes and QOF covering codes have properties that allow for the differentiation of unwanted signals and are known to those skilled in the art. Walsh codes are also known to those skilled in the art.

Both the short codes and the covering codes assist in the detection and acquisition of a selected signal. However, interference caused by other signals may still degrade data extraction capabilities of the selected signal. For example, as a mobile telephone communicates with a particular base station within that base station's coverage cell, signals from other base stations can interfere with the mobile telephone communication. Since cells often overlap one another to ensure that all desired geographic regions are included in the communication system's coverage area, one or more signals from one base station may interfere with the communication link, or "channel," between the mobile telephone and another base station. This effect is commonly referred to as cross-channel interference.

Cross-channel interference may occur because some channels are broadcast at greater power levels to all mobile telephones within the cell. These channels can "bleed" over into other cells and overpower a selected signal, thereby corrupting conveyed data. Examples of such channels include pilot channels which convey reference information and are also used to coherently demodulate channels. Other potentially interfering channels may convey paging information that alerts a particular mobile telephone to an incoming call and synchronization information that provides synchronization between a mobile telephone and a base station.

Still, other forms of interference may occur from "multipath" copies of a selected signal. Multipath can create interference because of the reception of copies of a selected signal at differing times. Multipath typically occurs because of obstructions, such as buildings, trees, et cetera, that create multiple transmission paths for a selected signal. These separate transmission paths may have unique distances that cause the signal to arrive at a receiver at differing times and is commonly referred to as co-channel interference. Additionally, these separate paths may bleed over into other cells to cause cross-channel interference.

Multipath creates co-channel interference because, among other reasons, the orthogonality of the covering code for a received signal is essentially lost due to timing offsets associated with the multipath. For example, a mutlipath signal having a covering code and arriving at a receiver at differing times causes a misalignment of the covering code. Such a misalignment can result in a high cross-correlation and a general inability to correctly retrieve conveyed data.

"Rake" receivers, such as those used in CDMA telephony systems, can assist in countering interfering effects caused by multipath. For example, a rake receiver may have a plurality of "fingers," wherein each finger of the rake receiver independently estimates channel gain and other signal characteristics (e.g., phase) of the selected signal to more accurately demodulate data of the selected signal and subsequently retrieve the data. Each finger is assigned a particular "path" of the selected signal (i.e., one of the paths of the multipath signal). Additionally, as signal characteristics change, the fingers may be assigned or de-assigned to other "paths" of the signal improve data retrieval.

Rake receivers can improve data retrieval of a received signal. However, present rake receivers do not substantially reduce cross-channel interference and/or co-channel interference. These interferers may still corrupt data as long as they exist in any substantial form. As communication systems become more complex and convey more data, specifications typically become more restrictive. Accordingly, the possibility that these forms of interference will degrade signal quality increases substantially.

SUMMARY

The present invention provides systems and methods a system for decreasing interference in a selected coded signal. The system includes a matrix generator for generating a matrix. The matrix may comprise vectors, the elements of which are formed from components of the interference. The interference may exist in the form of co-channel and/or cross channel interference, such as that found in CDMA telephony. The components of this interference may, therefore, be code components of the interference that are used to fill elements of the vectors. For example, each element of a particular vector represents a code component of an interfering coded signal.

The system also includes a processor, which uses the matrix to substantially remove the interference from the selected coded signal. For example, the processor may generate a projection operator that projects the coded signal substantially orthogonal to the interference such that the impact of interference on the selected coded signal is substantially reduced.

In one embodiment of the invention, a system for decreasing interference in a coded signal comprises: an interference selector configured for selecting the interference; a matrix generator communicatively coupled to the interference selector and configured for generating a matrix from the selected said interference, wherein the matrix comprises a plurality of vectors; and a processor configured for using the matrix to project the coded signal substantially orthogonal to the interference to decrease the interference, wherein at least one of the vectors comprises a plurality of elements with each element representing a component of the interference.

In another embodiment, the interference comprises at least one of a co-channel interference and a cross-channel interference.

In another embodiment, the cross-channel interference comprises at least one of a pseudorandom number code and a Walsh code.

In another embodiment, the co-channel interference comprises at least one of a pseudo noise code and a Walsh code.

In another embodiment, the coded signal comprises at least one of a pseudorandom number code and a Walsh code.

In another embodiment, the coded signal comprises a Code Division Multiple Access signal.

In another embodiment, the system is operable with a receiver, the receiver configured for receiving an analog signal comprising the coded signal and the interference.

In another embodiment, the system further comprises a memory configured for storing the matrix.

In another embodiment, the processor is further configured for processing a digital signal comprising the coded signal and the interference.

In another embodiment, the processor is further configured to generate a projection operator from the matrix for projecting the coded signal.

In another embodiment, the projection operator comprises the form:

$$P_s^\perp = I - S(S^T S)^{-1} S^T,$$

where $P_s^\perp$ is the projection operator, I is an identity matrix, S is the matrix and $S^T$ is a transpose of the matrix.

In another embodiment, the processor is further configured to generate a projection operator from the matrix for application to a reference signal, wherein the reference signal represents a code of the coded signal.

In another embodiment, the system further comprises an applicator configured for applying the projection operator to the reference signal to project the reference signal.

In another embodiment, the system further comprises a correlator.

In another embodiment, the system further comprises an applicator configured for applying a projection operator to a received signal comprising the coded signal and an interfering signal.

In one embodiment of the invention, a method of decreasing interference in a coded signal, comprising: generating a first vector from the interference; and using the first vector to project the coded signal substantially orthogonal to the interference to decrease the interference, wherein the first vector comprises a plurality of elements with each element representing a component of the interference.

In another embodiment, the method further comprises: generating a second vector from the interference; and forming the first and the second vectors into a matrix for decreasing the interference.

In another embodiment, the method further comprises: copying the matrix; and storing a copy of the matrix in memory in response to copying.

In another embodiment, the method further comprises transposing a copy of the matrix.

In another embodiment, using comprises generating a projection operator, wherein the projection operator comprises the form:

$$P_s^\perp = I - S(S^T S)^{-1} S^T,$$

where $P_s^\perp$ is the projection operator, I is an identity matrix, S is the matrix and $S^T$ is a transpose of the matrix.

In another embodiment, the method further comprises applying the projection operator to the coded signal to substantially remove the interference from the coded signal.

In another embodiment, the method further comprises applying the projection operator to a reference signal representing a code of the coded signal.

In another embodiment, the method further comprises correlating a component of a received signal In one embodiment of the invention, a system for decreasing interference in a coded signal comprises: means for generating a first vector from the interference; and means for using the first vector to project the coded signal substantially orthogonal to the interference to decrease the interference, wherein the first vector comprises a plurality of elements with each element representing a component of the interference.

In another embodiment, the system further comprises: means for generating a second vector from the interference; and means for forming the first and the second vectors into a matrix for decreasing the interference.

In another embodiment, the system further comprises means for copying the matrix; and means for storing a copy of the matrix in memory in response to copying.

In another embodiment, the system further comprises means for transposing a copy of the matrix.

In another embodiment, the means for using the first vector comprises means for generating a projection operator, wherein the projection operator comprises the form:

$$P_s^\perp = I - S(S^T S)^{-1} S^T,$$

where $P_s^\perp$ is the projection operator, I is an identity matrix, S is the matrix and $S^T$ is a transpose of the matrix.

In another embodiment, the system further comprises means for applying the projection operator to the coded signal to substantially remove the interference from the coded signal.

In another embodiment, the system further comprises means for applying the projection operator to a reference signal representing a code of the coded signal.

In another embodiment, the system further comprises means for correlating a component of a received signal. In one embodiment of the invention, a method of decreasing interference in a received signal, comprising: generating a matrix having at least one vector exclusively comprised of elements from an interfering signal; generating a projection operator from the matrix; and using the projection operator to substantially remove the interfering signal from the received signal.

In another embodiment, generating comprises operating on the matrix to generate the projection operator according to the form:

$$P_s^\perp = I - S(S^T S)^{-1} S^T,$$

where $P_s^\perp$ is the projection operator, I is an identity matrix, S is the matrix and $S^T$ is a transpose of the matrix.

In another embodiment, applying the projection operator to the received signal.

In another embodiment, the method further comprises applying the projection operator to a reference signal representing a code of a selected coded signal.

In another embodiment, the method further comprises correlating a component of a received signal. In one embodiment of the invention, a system for decreasing interference in a received signal, comprising: a matrix generator configured for generating a matrix having at least one vector exclusively comprised of elements from an interfering signal; and a processor configured for generating a projection operator from the matrix and configured for using the projection operator to substantially remove the interfering signal from the received signal.

In another embodiment, the processor is further configured for operating on the matrix to generate the projection operator according to the form:

$$P_s^\perp = I - S(S^T S)^{-1} S^T,$$

where $P_s^\perp$ is the projection operator, I is an identity matrix, S is the matrix and $S^T$ is a transpose of the matrix.

In another embodiment, the system further comprises an applicator configured for applying the projection operator to the received signal.

In another embodiment, the system further comprises an applicator configured for applying the projection operator to a reference signal representing a code of a selected coded signal.

In another embodiment, the system further comprises a correlator.

DETAILED DESCRIPTION OF THE DRAWINGS

Figure 1:
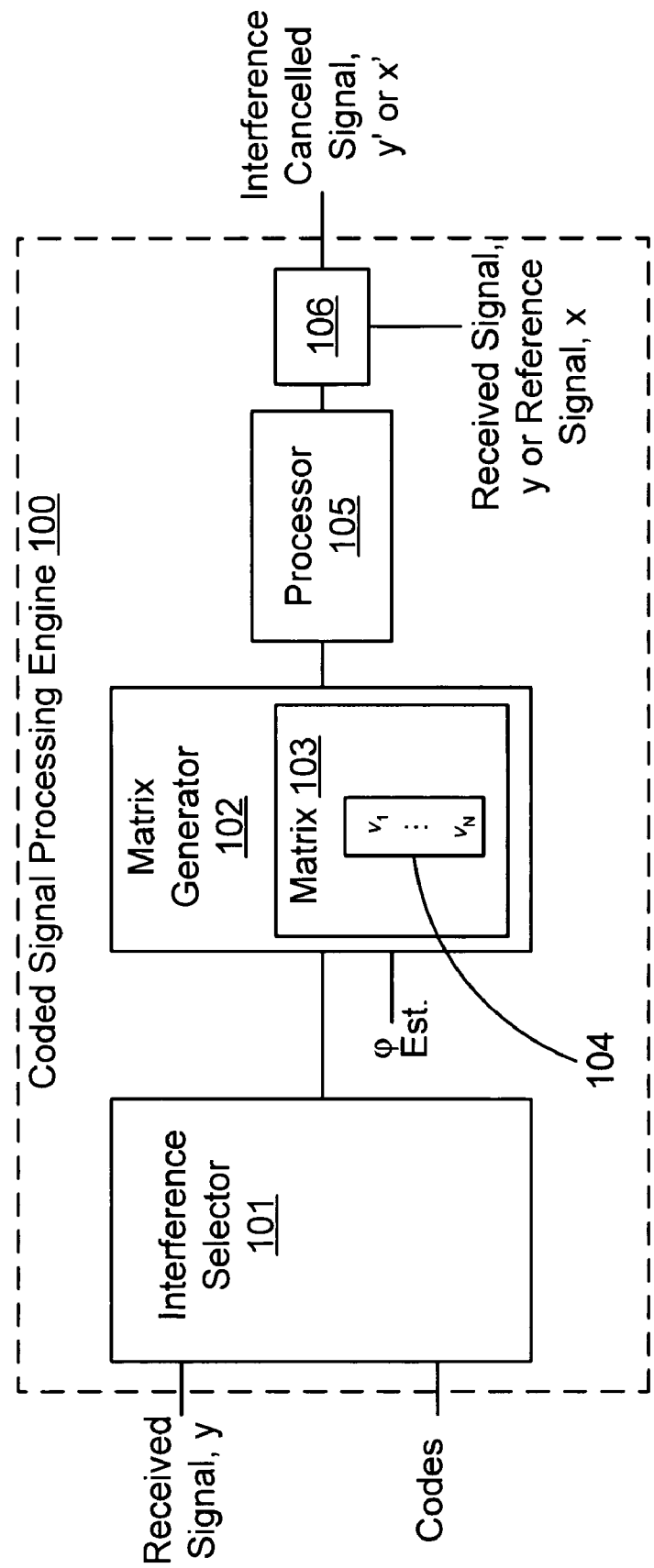
FIG. 1 is a block diagram of an exemplary system in one exemplary embodiment of the invention.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the spirit and scope of the invention as defined by the claims.

FIG. 1 is a block diagram of an exemplary system 100 in one exemplary embodiment of the invention. System 100 may be used to decrease interference in a selected coded signal. For example, system 100 may be used to substantially remove interference, such as co-channel and cross-channel interference, in a CDMA signal used in cellular telephony.

System 100 includes interference selector 101 for selecting interference and providing a selected "on-time" interfering PN code(s) to matrix generator 102. On-time as used herein refers to a particular timing alignment for a PN code, such as that relating to received data for a corresponding tracked signal of a receiver finger. The interference selector 101 may be configured for using the received signal (y) and the PN codes of assigned receiver fingers.

System 100 also includes matrix generator 102 configured for using the selected interfering PN code and a phase estimate corresponding to that PN code. In addition, it is configured for generating matrix 103 comprising one or more vectors 104. The vectors 104 comprise elements v (labeled $v_1 \ldots v_N$), with each of these elements representing a component of the interference. For example, an element v may represent a code component from an interfering signal of either the co-channel interference or the cross-channel interference. In this embodiment, the codes may comprise a selected Walsh covering code and an on-time PN code of the selected interferer. The elements v of a single interfering signal thereby form a vector 104 representing interference of another signal. The resulting interference vector is multiplied by an estimate of the phase of the selected interferer. As multiple vectors 104 may be used to represent multiple interfering signals, matrix generator 103 may combine these "interference vectors" 104 into an "interference matrix" 103.

System 100 also includes processor 105 configured for using matrix 103 to project the selected coded signal substantially orthogonal to the interference so as to substantially cancel the interference on the signal. The processor 105 may be configured generate a projection operator for subsequent application to the received signal (y) or to one or more on-time reference codes (x; e.g., a PN code of a selected signal). The processor 105 produces a projection operator that may be applied to either y or x by applicator 106 to produce an interference cancelled signal (y') or one or more on-time interference cancelled reference codes (x'). To illustrate, interfering signals may form a mathematical signal space that processor 105 may use to generate a projection operator for projecting the selected signal onto a subspace that is substantially orthogonal to that of the interfering signals. The substantial orthogonality between the two subspaces results in little or no energy contribution from the interfering signals of one subspace to selected signal(s) of the other. The interfering signals are, in essence, mathematically removed from the selected coded signals. This projection, therefore, causes the interfering signals to be cancelled from the received signal.

Those skilled in the art should readily recognize that such a system may be implemented through software, firmware, hardware and/or any combination thereof. For example, the substantially orthogonal projection may be computed through the use of software instructions operable within an Application Specific Integrated Circuit ("ASIC") or a general purpose processor. In such an implementation, certain processing errors may exist, such as processing errors, which yield a range of projections that are more or less orthogonal (i.e., substantially orthogonal). Of course, those skilled in the art should readily recognize that such processing errors are often a matter of processor dependent precision and/or design choice.

Figure 2:
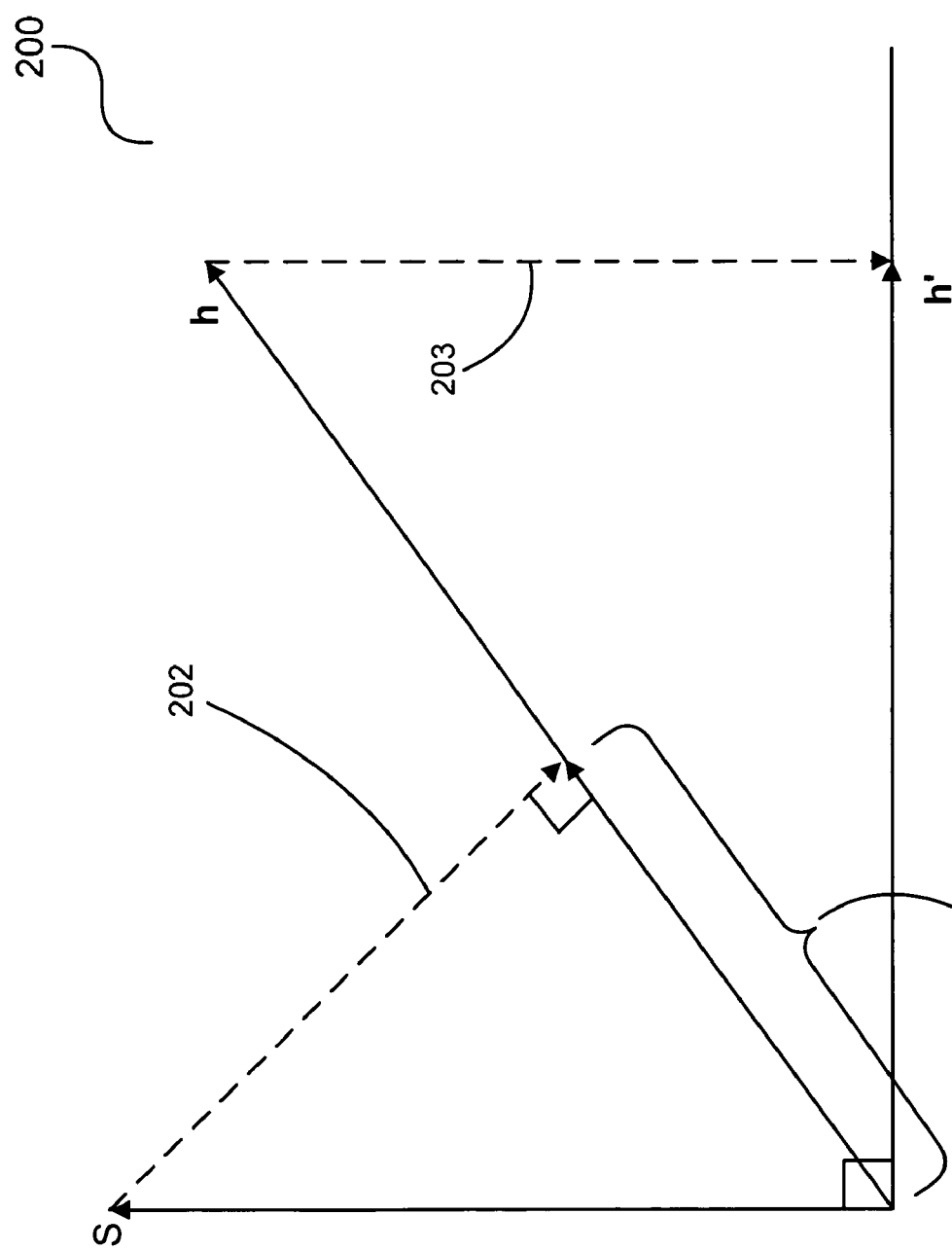
FIG. 2 is a graph illustrating a projection of a coded signal in one exemplary embodiment of the invention.

FIG. 2 is graph 200 illustrating a projection of a coded signal in one exemplary embodiment of the invention. In this embodiment, two vectors, S and h are shown. The vector S may be a "composite" vector representing components of interfering coded signals, such as cross-channel interfering signals and co-channel interfering signals. For example, the vector S is shown having an angle and magnitude that represents the summation of multiple vectors, each having an angle and magnitude representing a particular interfering signal (i.e., the signal strength that a particular receiver observes relative to other signal strengths). This vector S impacts the ability to resolve the vector h.

The vector h represents a selected coded signal, in this embodiment. For example, the vector h may represent a CDMA signal, such as that used in CDMA telephony, selected for demodulation. The vector h similarly has an angle and a magnitude related to the signal strength that a particular receiver observes.

As shown in this exemplary embodiment, the vector S has some impact on the vector h. This impact causes degradation in the signal quality of the selected coded signal associated with vector h. The impact (i.e., magnitude 201) is determinable from the projection of vector S onto vector h, illustrated by the substantially orthogonal projection 202. Those skilled in the art understand mathematical projections.

To substantially counter the effects of the vector S influence, the vector h is mathematically projected in such a way as to make a new vector h' substantially orthogonal to the vector S. A processor, such as processor 103 of FIG. 1, may project the vector h' using an interference matrix, such as matrix 102 of FIG. 1.

The matrix as previously described may comprise code components of interfering coded signals (i.e., those represented by vector S) which may be used to form a projection operator. This projection operator, described in greater detail in FIG. 3, may be applied to a reference signal, such as the code of the selected coded signal, to subsequently project the reference signal substantially orthogonal to the composition of selected interfering signals. For example, the projection operator may be applied to the code of the selected coded signal such that the code is orthogonally projected from the interfering codes. The product of this application may then be correlated with the received signal to extract the selected coded signal for demodulation with substantially less interference being introduced from the other coded signals. Accordingly, such a projection has the substantial effect of mathematically canceling, or removing, undesirable interfering coded signals from a selected coded signal.

In another embodiment, the projection operator may be applied to the received signal itself. This application product may then be correlated with the code of the selected coded signal to extract the selected signal. Those skilled in the art should readily recognize that such a correlation may be performed in other ways to effectuate such an extraction of a selected coded signal. While projection has been described in detail, the invention is not intended to be limited to the exemplary embodiment shown herein.

Figure 3:
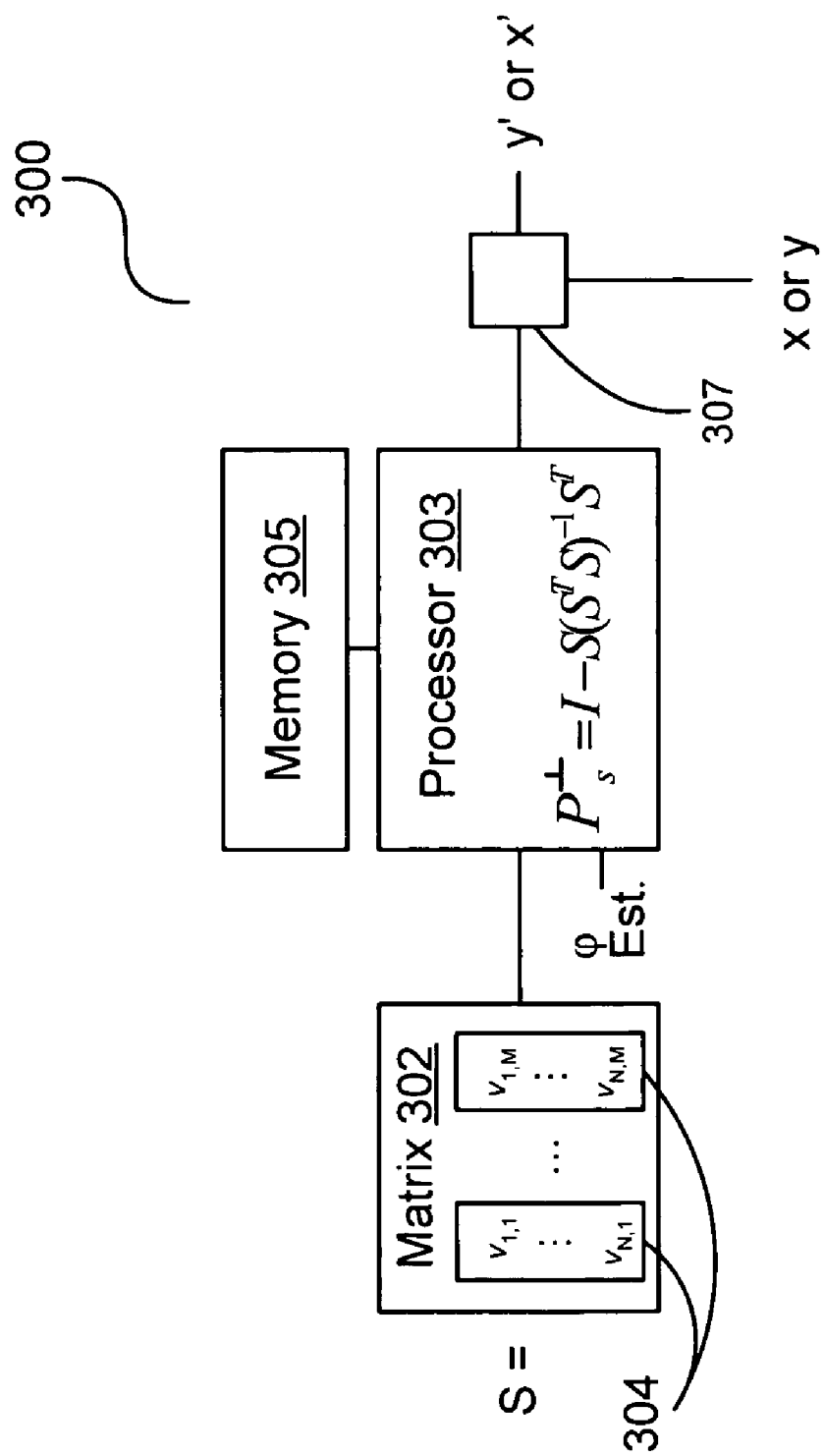
FIG. 3 is block diagram of a system in another exemplary embodiment of the invention.

FIG. 3 is block diagram of system 300 in another exemplary embodiment of the invention. In this exemplary embodiment, processor 303 uses matrix 302 to generate a projection operator $P_s^\perp$ for substantial cancellation of interfering signals from a received signal. Matrix 302 comprises vectors 304, with each vector comprising elements v (labeled $v_{1,1} \ldots v_{N,1} \ldots v_{1,M} \ldots v_{N,m}$) of the interfering signals. For example, each vector 304 may comprise code components of a single coded signal, such as an interfering CDMA signal. Each element of a particular vector may represent a code component of the interfering coded signal associated with that vector. The vectors 304 subsequently form an interference matrix S (i.e., matrix 302).

The vectors 304 may include components of co-channel interfering signals and/or cross-channel interfering signals. For example, each element of a particular vector may represent a portion of code used by an interfering signal to spread and/or otherwise encode its underlying data. Alternatively, each element of a vector may correspond to a composition of code portions from a plurality of signals. Such codes are typically well known codes used in wireless communications. However, matrix 302 may include vectors 304 of other coded signals. Therefore, the invention is not intended to be limited to coded signals emanating from any particular system. Rather, matrix 302 may be used to substantially remove other coded signals.

Processor 303 generates the projection operator from matrix 302 according to the following form:

$$P_s^\perp = I - S(S^T S)^{-1} S^T, \qquad (\text{Eq. 1})$$

where $P_s^\perp$ is the projection operator, I is an identity matrix, S as mentioned is the interference matrix 302 and $S^T$ is a transpose of the matrix 302. Processor 303 may generate the projection operator $P_s^\perp$ by copying matrix 302 to produce Eq. 1; however, processor 303 may alternatively generate the projection operator $P_s^\perp$ through known linear algebraic operations on a single matrix. Processor 303 may be communicatively coupled to memory 305 for storing the copies and/or transposed copies of matrix 302.

With the projection operator $P_s^\perp$ generated, applicator 307 may apply the projection operator $P_s^\perp$ with the received signal and/or the reference signal, depending on the implementation, to project the signal in a substantially orthogonal manner with respect to the interfering signals.

Figure 4:
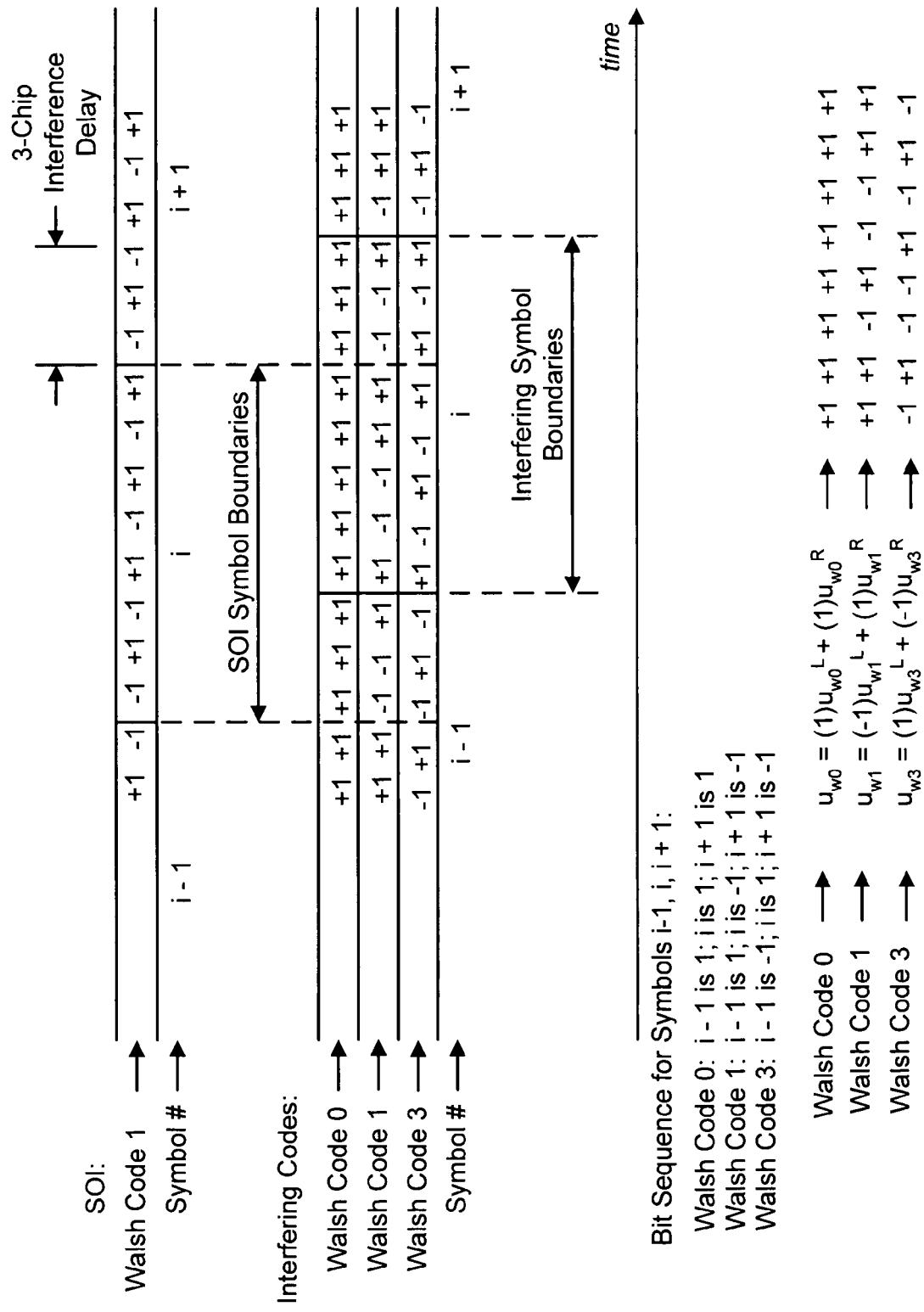
FIG. 4 illustrates matrix generation in one exemplary embodiment of the invention.

FIG. 4 illustrates matrix generation in one exemplary embodiment of the invention. More specifically, FIG. 4 illustrates the generation of an interference matrix by a matrix generator, such as matrix generator 101 of FIG. 1. Such an interference matrix may be a multi rank matrix and exemplary of matrix 302 of FIG. 3. The matrix described herein may be used in part to produce a projection operator, such as that of Eq. 1.

In this exemplary embodiment, indices i−1, i and i+1 represent symbols of a selected coded signal coinciding with symbols of interfering signals. The interfering signals are shown as Walsh codes 0, 1 and 3. The Walsh codes shown herein are derived from a rank 8 Hadamard matrix. Those skilled in the art should readily recognize Hadamard matrices and that Walsh codes may be derived from other ranks of Hadamard matrices. For example, Walsh codes may be derived from rank 64 or rank 128 Hadamard matrices. Accordingly, matrix generation is not intended to be limited to the exemplary embodiment of the rank 8 Hadamard matrix as a matrix may be generated to include PN spreading codes.

The Walsh code 0 is a typical code used for a pilot channel used in some CDMA telephony systems, such as cdmaOne and cdma2000 systems, wherein the bit sequence of symbols is a transmission of all +1's. The remaining Walsh codes (e.g., Walsh codes 1 and 3) in this embodiment are representative of other channels within a CDMA telephony system. The remaining Walsh codes are illustrated as having a bit sequence of symbols +1, −1, −1 for Walsh code 1 and −1, +1, −1 for Walsh code 3.

For the purposes of this illustration, a 3-chip delay is shown between the selected signal and the interfering signals. The focus of interference is within symbol interval "i" of the selected signal. Accordingly, a symbol boundary of the interfering signals lies within each symbol of the signal of interest (i.e., between the symbol boundaries of the selected signal). Interference vectors are formed from chip-symbol combinations of these interfering signals. For example, $u_{wx}^L$ represents interference from an interfering Walsh code overlapping the left side portion of a symbol of the selected signal with chips beyond that left side portion set to 0 (the subscript x indicates the Walsh code number). In the order of interfering signals, Walsh Code 0, 1 and 3, components of the interference vectors overlapping the left side of the symbol of the selected signal are therefore:

$$u_{w0}^L = \{+1, +1, +1, 0, 0, 0, 0, 0\}$$

$$u_{w1}^L = \{-1, -1, +1, 0, 0, 0, 0, 0\}$$

$$u_{w3}^L = \{-1, +1, -1, 0, 0, 0, 0, 0\}.$$

Similarly, $u_{wx}^R$ represents interference from an interfering Walsh code overlapping the right side portion of a symbol of the selected signal with chips beyond that right side portion set to 0 (again, the subscript x indicates the Walsh code number). Shown in the same order, the components of the interference vectors overlapping the right side portion of the symbol of the selected signal are:

$$u_{w0}^R = \{0, 0, 0, +1, +1, +1, +1, +1\}$$

$$u_{w1}^R = \{0, 0, 0, +1, -1, -1, +1, +1\}$$

$$u_{w3}^R = \{0, 0, 0, +1, -1, +1, -1, +1\}.$$

Based on the bit sequence of their respective transmitted signals, chips of the interfering signals are multiplied by their corresponding symbol. In this example, the bit sequences for the symbol intervals, i, i−1 and i+1, of the interfering signals (i.e., Walsh Codes 0, 1 and 3) are as follows:

Walsh Code 0: i−1=1; i=1; i+1=1

Walsh Code 1: i−1=1; i=1; i+1=1

Walsh Code 3: i−1=1; i=1; i+1=1.

The chips from both the left and right side portions are multiplied by their symbols and combined to form interference vectors $u_{wx}$ as follows (subscript x designating the Walsh code number):

$$u_{w0} = (+1)^* u_{w0}^L + (+1)^* u_{w0}^R = \{+1, +1, +1, +1, +1, +1, +1, +1\}$$

$$u_{w1} = (-1)^* u_{w1}^L + (+1)^* u_{w1}^R = \{+1, +1, -1, +1, -1, -1, +1, +1\}$$

$$u_{w3} = (+1)^* u_{w3}^L + (-1)^* u_{w3}^R = \{-1, +1, -1, -1, +1, -1, +1, -1\}.$$

These interference vectors (i.e., vectors containing components of the interfering codes) may be multiplied by an interfering phase estimate and an interfering on-time PN code to construct an interference matrix. Resulting vectors may be used as row or column vectors of the matrix.

While one embodiment of matrix generation has been shown, those skilled in the art should readily recognize that other embodiments may fall within the scope and spirit of the invention. For example, the interference vectors may be formed from other coded signals that do not necessarily comprise Walsh codes. Further, these vectors may represent co channel interference, and/or cross channel interference caused by coded signals. Accordingly, the invention is not intended to be limited to the exemplary embodiment shown herein. Rather, the invention is intended to be limited to the language recited in the claims.

Figure 5:
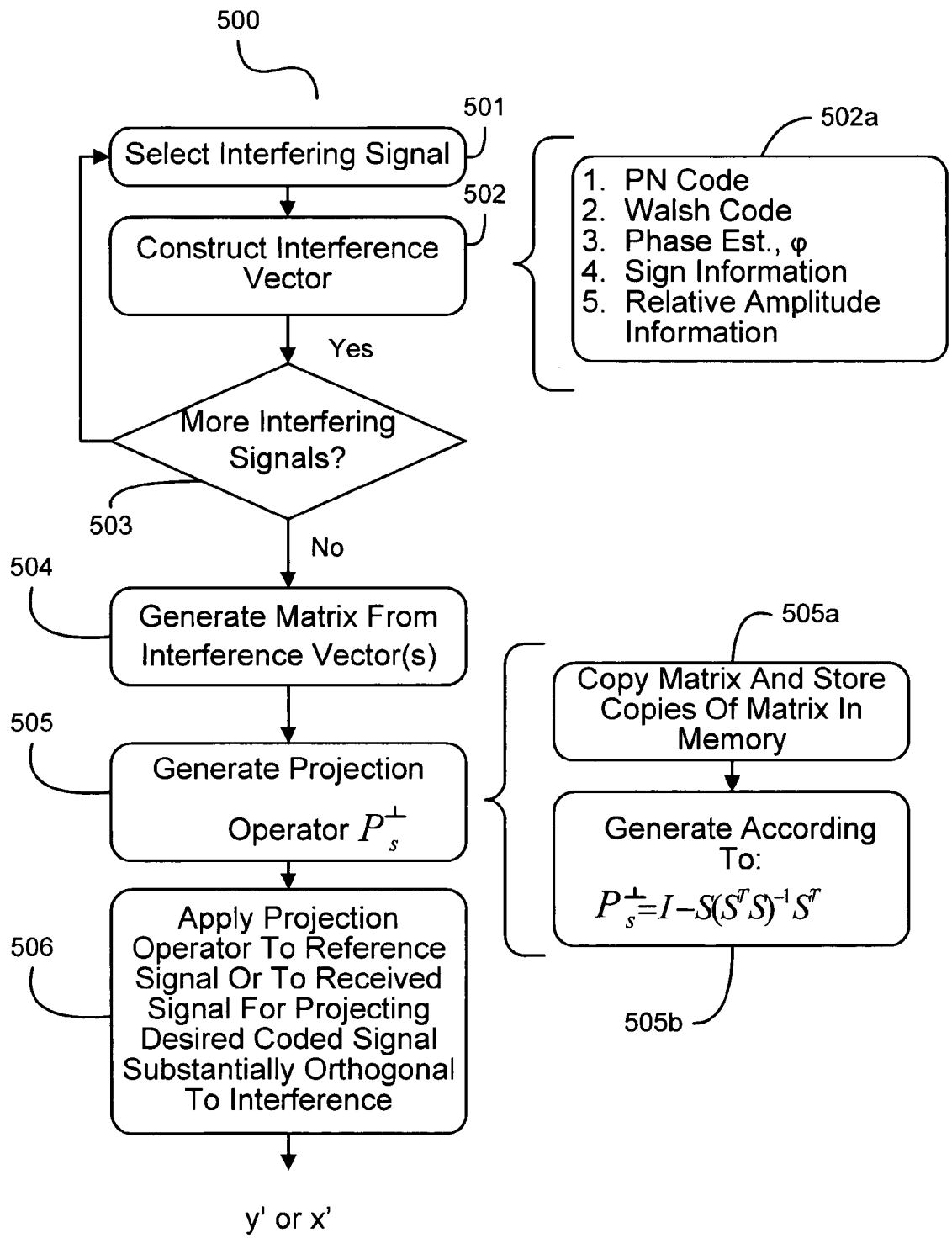
FIG. 5 is a flow chart illustrating in one exemplary methodical embodiment of the invention.
Figure 6:
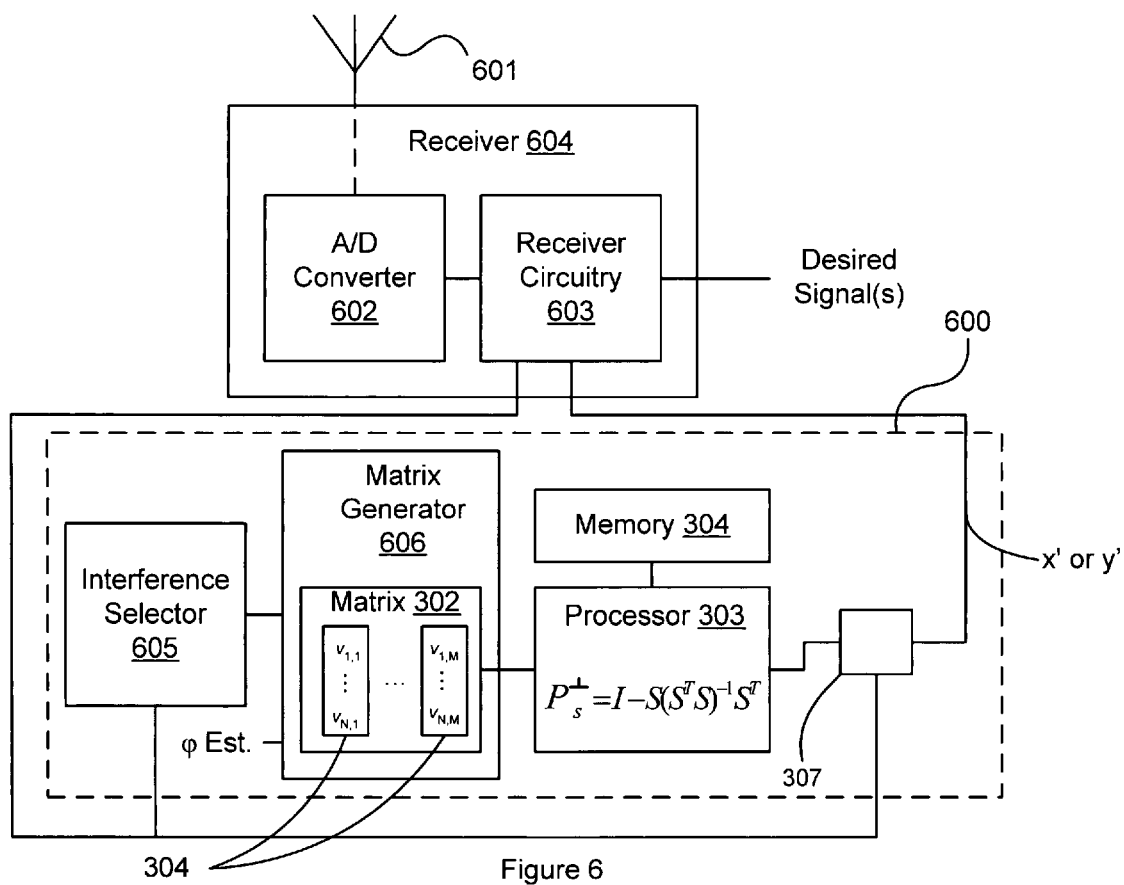
FIG. 6 is a block diagram of a system operable with a receiver in one exemplary embodiment of the invention.

FIG. 5 is flow chart 500 illustrating in an exemplary methodical embodiment of the invention. In this embodiment, an interfering signal is selected for cancellation, in element 501. An interference vector is constructed for a selected interfering signal, in element 502. The interference vector may be constructed in a manner described in FIG. 4. In one embodiment, the interference vector is constructed with the on-time PN code (element 502a(1)), a Walsh code (element 502a(2)) and a phase estimate (element 502a(3)) corresponding to the selected interfering signal. Additionally, the construction may include sign (i.e., bit) information (element 502a(4)) or relative amplitude information (element 502a(5)) that may be multiplied with the interference vector constructed in elements 502a(1–3). A determination is made regarding the number of interfering signals to cancel such that other interference vectors may be generated to form a matrix comprising a plurality of interference vectors (e.g., matrix 605 of FIG. 6 shown below), in element 503. For example, a system, such as system 100 of FIG. 1, may determine that other signals are interfering with the selected signal based on gains of the interfering signals and/or selected signals (e.g., relative amplitudes of the signals). An interfering signal may "overpower" and potentially corrupt a selected signal because of its gain. As such, signals may be subsequently chosen as an interference inputs to the matrix based on amplitudes relative to amplitudes of the selected signal and/or some reference signal.

Once a signal is determined to be an interfering, the signal may be input to the matrix and the system may use other interfering signals to generate additional interference vectors. If more vectors are needed, element 503 returns to element 501 to construct additional interference vectors. If no other vectors are necessary, element 503 proceeds to element 504 to generate an interference matrix from the interference vectors.

After generating the interference matrix, a processor, such as processor 303 of FIG. 3, generates a projection operator $P_s^\perp$, element 505. In generating the projection operator, the processor may copy the matrix and store copies of the matrix in memory, in element 505a. With the matrix processing performed, the processor may process the copies, both original and transposed, for generating the projection operator $P_s^\perp$ according to equation Eq. 1, in element 505b. Alternatively, the processor may generate the projection operator $P_s^\perp$ through known linear algebraic operations on a single matrix.

A correlator, such as correlator 306 of FIG. 3, may apply the projection operator $P_s^\perp$ to a signal for projecting the signal substantially orthogonal to the interference, in element 506. For example, the correlator may apply the projection operator $P_s^\perp$ to a reference signal comprising the code of the selected coded signal so as to orthogonally project the reference signal as described above. Alternatively, the projection operator $P_s^\perp$ may be applied to the received signal. In such an embodiment, the resultant interference cancelled signal is transmitted to the receiver circuitry of a receiver, such as receiver circuitry 603 of FIG. 6.

FIG. 6 is a block diagram of a system operable with a receiver 604 in one exemplary embodiment of the invention. In this embodiment receiver 604 is a CDMA receiver such as that used in a CDMA cell phone or a CDMA base station. Receiver 604 typically comprises an analog to digital (A/D) converter 602 configured for converting a signal received by antenna 601 into a digital signal. The signal may comprise a plurality of CDMA signals including, but not limited to, a selected CDMA signal(s), co-channel interfering CDMA signals and/or cross-channel interfering CDMA signals. After converting the signal to digital, A/D converter 602 transfers the digitized signal to receiver circuitry 603. Receiver circuitry 603 may perform additional processing on the digitized signal in preparation for extracting the selected CDMA signal(s). CDMA receivers are well known.

In this embodiment, system 600 is communicatively coupled to receiver circuitry 603 for interference cancellation of the digitized signal. Interference selector 605 may receive the digitized signal from the receiver 604 to determine which signals are interfering so that interference vectors may be formed and input to matrix 302. For example, matrix generator 606 may determine code components of the selected interfering signals and use those components as elements v of interference vectors, such as that described in FIG. 4. With matrix 302 constructed, processor 303, can generate the projection operator $P_s^\perp$ according to equation Eq. 1 described in FIG. 3. Operations such as copying the matrix and storing the matrix with memory 305 are also described in FIG. 3. Once the projection operator $P_s^\perp$ is generated, applicator 307 may apply the projection operator to a reference signal(s) (e.g., the code of the selected coded signal) to initiate projection of the selected signal(s). Applicator 307 may then apply this product to the received signal to project the selected signal(s) onto a subspace that is substantially orthogonal that of the interfering signal(s). Alternatively, applicator 307 may apply the projection operator to the received signal to initiate projection and apply the product to the reference signal to project the selected signal(s). Once the projection operator $P_s^\perp$ is applied CSPE 600 transfers the interference cancelled signal to receiver circuitry 603 for additional processing. Connection between CSPE 600 and receiver circuitry 603 are described in greater detail in FIGS. 7 and 8.

Figure 7:
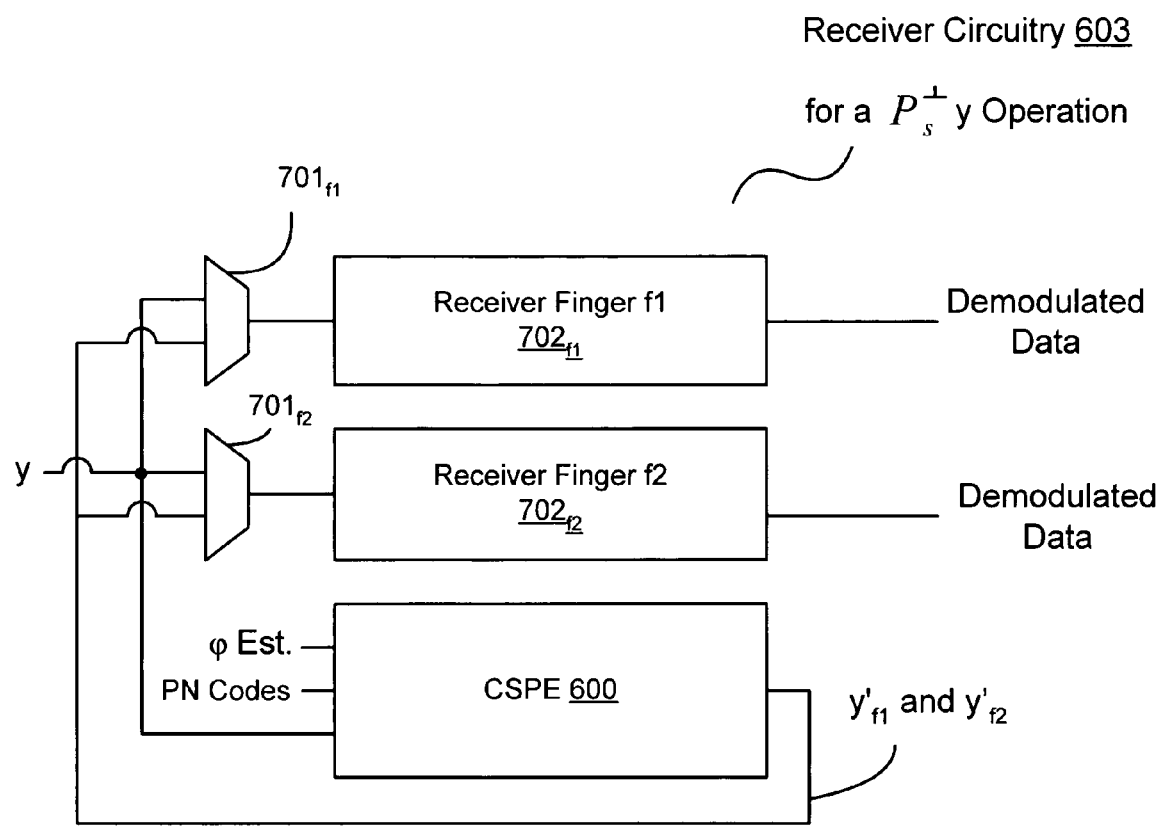
FIG. 7 shows a block diagram of exemplary receiver circuitry.

FIG. 7 shows a block diagram of one exemplary receiver circuitry, such as receiver circuitry 603 of FIG. 6. In this embodiment, the received signal y is transferred to selector 701 (the subscript of selector 701 corresponds to a receiver finger) and to CSPE 600 of FIG. 6. The selector 701 may specify whether the receiver finger 702 receives the received signal y or the interference cancelled signal y'. The receiver finger 702 may perform phase estimation and time tracking to produce an on-time PN code. The receiver finger 702 may subsequently use the PN code for demodulation. The CSPE 600 uses estimates of phase and on-time PN codes of the potential interfering signals. These interfering signals may correspond to the signals assigned to receiver fingers 702. CSPE 600 may use these interfering signals, as described above, to generate an interference cancelled signal y'. Once cancelled, an interference cancelled signal may be transferred to selector 701 for selected demodulation. Those skilled in the art should readily recognize that the receiver described herein should not be limited to the number of receiver fingers 702 shown in the exemplary embodiment. Rather a plurality of receiver fingers 702 may be used.

Figure 8:
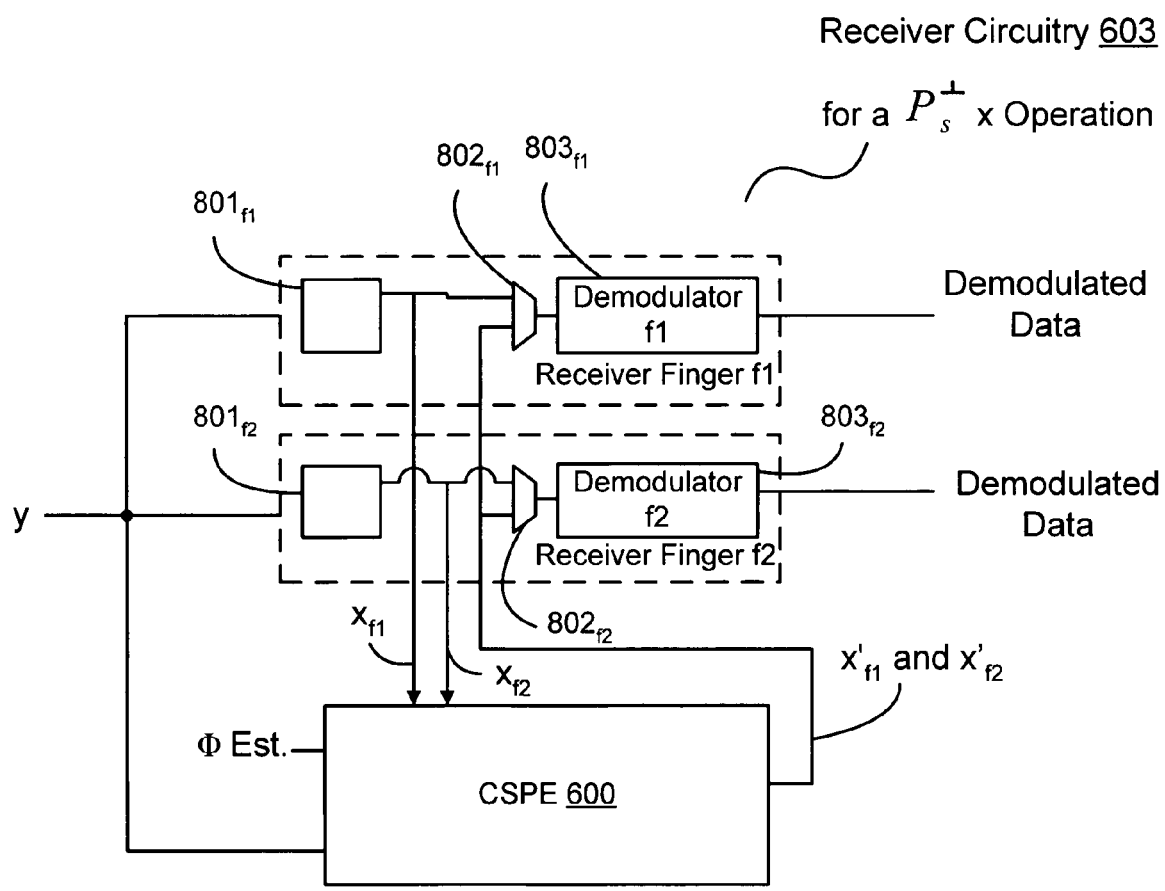
FIG. 8 shows a block diagram of exemplary receiver circuitry.

FIG. 8 shows a block diagram of exemplary receiver circuitry, such as receiver circuitry 603 of FIG. 6. In this embodiment, the received signal y is transferred to receiver finger f1, receiver finger f2 and CSPE 600. Time tracking and phase estimation may be performed in 801 with the received signal y. The on-time reference PN code is produced and may be sent to a selector 802 and the CSPE 600. The CSPE 600 uses phase estimates and on-time PN codes from potential interfering signals. As in FIG. 7, these interfering signals may correspond to the signals assigned to receiver fingers (i.e., f1 and f2). CSPE 600 may use these interfering signals to generate one or more interference cancelled signals x'. Once cancelled, an interference cancelled signal may be transferred to selector 802. Selector 802 selects one of x or x' for transfer to demodulator 803 such that the demodulator may demodulate the received signal y. Again, those skilled in the art should readily recognize that the receiver described herein should not be limited to the number of receiver fingers 702 shown in the exemplary embodiment.

Figure 9:
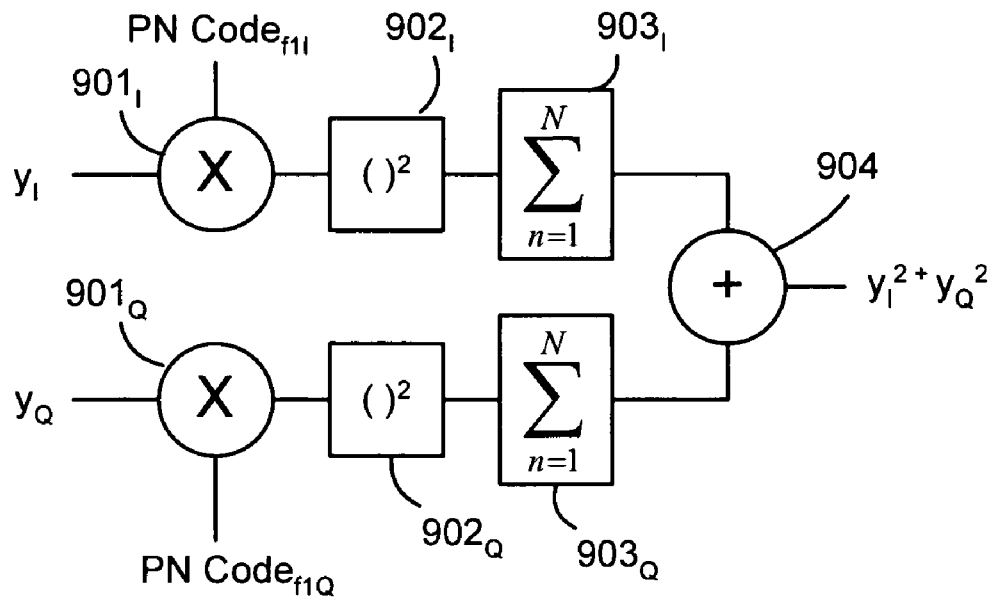
FIG. 9 shows an embodiment of an exemplary pilot amplitude estimation that may be used in an interference selector.

FIG. 9 shows an embodiment of an exemplary pilot amplitude estimation that may be used in interference selector 101. This pilot amplitude estimation may be used to select interfering signals for an interference matrix, such as matrix 302 of FIG. 3. In this embodiment, the received signal y is depicted as separate I and Q data streams. Each signal stream is multiplied via module 901 with an on-time PN code corresponding to a potential interfering signal. Each resulting element is squared in module 902 and summed in module 903 over a length N (where N is an integer greater than 1). Each resulting sum may be added in module 904 to produce an amplitude estimate $y_I^2 + Y_Q^2$. Those skilled in the art should readily recognize that other implementations may produce similar amplitude estimates. Additionally, the embodied amplitude estimator may be used to estimate amplitudes of signals other than pilot signals. Such an embodiment may include the application of other codes in module 901.

Figure 10:
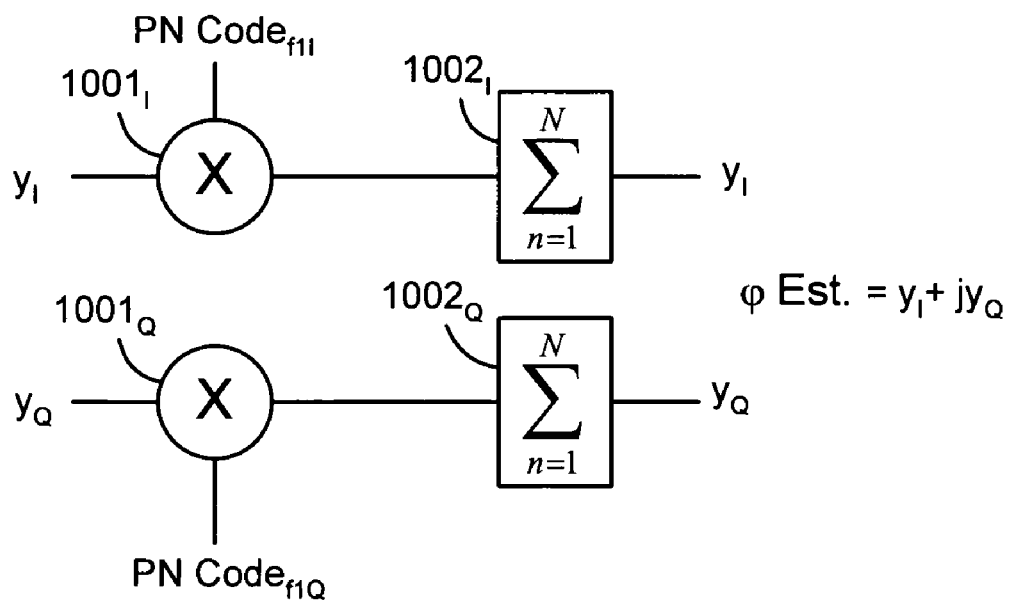
FIG. 10 shows an embodiment of an exemplary phase estimation that may be used by a matrix generator to produce a matrix of interference vectors.

FIG. 10 shows an embodiment of an exemplary phase estimation that may be used by a matrix generator, such as matrix generator 606 of FIG. 6, to produce a matrix of interference vectors (e.g., vectors 304 of matrix 302 of FIG. 6). The received signal y is again depicted as separate I and Q data streams. Each of the I and the Q data streams is multiplied via module 1001 with an on-time PN code corresponding to a potential interfering signal. Each resulting element may be summed in module 1002 over a length N. Each resulting sum may be used as a phase estimate $y_I + y_Q$. Those skilled in the art should readily recognize that other implementations may produce similar phase estimates.

While one embodiment has been shown in detail, system 600 may be operable in other types of devices, such as GPS receivers and/or other coded signal receivers. Accordingly, the invention is not intended to be limited to the embodiment shown herein. Rather, the invention should only be limited by the language of the claims below.

The embodiments described herein may substantially reduce interference caused by unwanted signals and improve signal processing. For example, poor signal quality due to interference may deleteriously affect acquisition, tracking and demodulation of selected signals. A reduction of interference may, therefore, result in improved signal processing and error reduction. In regards to such benefits, the embodiments herein may advantageously require use within a CDMA telephony system. Improved processing within a CDMA telephony system may be exploited in terms of increased system capacity, transmit power reduction, system coverage and/or data rates.

Additionally, it should be noted that the above embodiments of the invention may be implemented in a variety of ways. For example, the above embodiments may be implemented from software, firmware, hardware or combinations thereof. Those skilled in the art are familiar with software, firmware, hardware and their various combinations. To illustrate, those skilled in the art may choose to implement aspects of the invention in hardware using Application Specific Integrated Circuits ("ASIC") chips and/or other integrated circuitry, such as custom designed circuit and/or Xilinx chips. Alternatively, aspects of the invention may implemented through combinations of software using Java, C, C++, Matlab, and/or processor specific machine and assembly languages. Accordingly, those skilled in the art should readily recognize that such implementations are a matter of design choice and that the invention should not be limited to any particular implementation.

While the invention has been illustrated and described in detail in the drawings and foregoing description, such illustration and description is to be considered as exemplary and not restrictive in character. Accordingly, it should be understood that only the preferred embodiment and minor variants thereof have been shown and described and that all changes and modifications that come within the spirit of the invention are desired to be protected.

What is claimed is:

1. A system for decreasing interference in a coded signal, comprising:
   an interference selector configured for selecting the interference;
   a matrix generator communicatively coupled to the interference selector and configured for generating a matrix from the selected said interference, wherein the matrix comprises a plurality of vectors; and
   a processor configured for using the matrix to project the coded signal substantially orthogonal to the interference to decrease the interference,
   wherein at least one of the vectors comprises a plurality of elements with each element representing a component of the interference.

2. The system of claim 1, wherein the interference comprises at least one of a co-channel interference and a cross-channel interference.

3. The system of claim 2, wherein the cross-channel interference comprises at least one of a pseudorandom number code and a Walsh code.

4. The system of claim 2, wherein the co-channel interference comprises at least one of a pseudo noise code and a Walsh code.

5. The system of claim 1, wherein the coded signal comprises at least one of a pseudorandom number code and a Walsh code.

6. The system of claim 1, wherein the coded signal comprises a Code Division Multiple Access signal.

7. The system of claim 1, wherein the system is operable with a receiver, the receiver configured for receiving an analog signal comprising the coded signal and the interference.

8. The system of claim 1, wherein the system further comprises a memory configured for storing the matrix.

9. The system of claim 1, wherein the processor is further configured for processing a digital signal comprising the coded signal and the interference.

10. The system of claim 1, wherein the processor is further configured to generate a projection operator from the matrix for projecting the coded signal.

11. The system of claim 10, wherein the projection operator comprises the form:

$$P_s^\perp = I - S(S^T S)^{-1} S^T,$$

where $P_s^\perp$ is the projection operator, I is an identity matrix, S is the matrix and $S^T$ is a transpose of the matrix.

12. The system of claim 1, wherein the processor is further configured to generate a projection operator from the matrix for application to a reference signal, wherein the reference signal represents a code of the coded signal.

13. The system of claim 12, further comprising an applicator configured for applying the projection operator to the reference signal to project the reference signal.

14. The system of claim 12, further comprising a correlator.

15. The system of claim 1, further comprising an applicator configured for applying a projection operator to a received signal comprising the coded signal and an interfering signal.

16. A method of decreasing interference in a coded signal, comprising:
   generating a first vector from the interference;
   using the first vector to project the coded signal substantially orthogonal to the interference to decrease the interference, wherein the first vector comprises a plurality of elements with each element representing a component of the interference;
   generating a second vector from the interference; and
   forming the first and the second vectors into a matrix for decreasing the interference.

17. A method of decreasing interference in a coded signal, comprising:
   generating a first vector from the interference;
   using the first vector to project the coded signal substantially orthogonal to the interference to decrease the interference, wherein the first vector comprises a plurality of elements with each element representing a component of the interference;
copying the matrix; and
storing a copy of the matrix in memory in response to copying.

18. A method of decreasing interference in a coded signal, comprising:
generating a first vector from the interference;
using the first vector to project the coded signal substantially orthogonal to the interference to decrease the interference, wherein the first vector comprises a plurality of elements with each element representing a component of the interference; and
transposing a copy of the matrix.

19. A method of decreasing interference in a coded signal, comprising:
generating a first vector from the interference;
using the first vector to project the coded signal substantially orthogonal to the interference to decrease the interference, wherein the first vector comprises a plurality of elements with each element representing a component of the interference, and using comprises generating a projection operator, wherein the projection operator comprises the form:

$$P_s^\perp = I - S(S^T S)^{-1} S^T,$$

where $p_s^\perp$ is the projection operator, I is an identity matrix, S is the matrix and $S^T$ is a transpose of the matrix.

20. The method of claim 19, further comprising applying the projection operator to the coded signal to substantially remove the interference from the coded signal.

21. The method of claim 19, further comprising applying the projection operator to a reference signal representing a code of the coded signal.

22. The method of claim 21, further comprising correlating a component of a received signal.

23. A system configured for decreasing interference in a coded signal, comprising:
means for generating a first vector from the interference;
means for using the first vector to project the coded signal substantially orthogonal to the interference to decrease the interference, wherein the first vector comprises a plurality of elements with each element representing a component of the interference;
means for generating a second vector from the interference; and
means for forming the first and the second vectors into a matrix for decreasing the interference.

24. A system configured for decreasing interference in a coded signal, comprising:
means for generating a first vector from the interference;
means for using the first vector to project the coded signal substantially orthogonal to the interference to decrease the interference, wherein the first vector comprises a plurality of elements with each element representing a component of the interference;
means for copying the matrix; and
means for storing a copy of the matrix in memory in response to copying.

25. A system configured for decreasing interference in a coded signal, comprising:
means for generating a first vector from the interference;
means for using the first vector to project the coded signal substantially orthogonal to the interference to decrease the interference, wherein the first vector comprises a plurality of elements with each element representing a component of the interference; and
means for transposing a copy of the matrix.

26. A system configured for decreasing interference in a coded signal, comprising:
means for generating a first vector from the interference;
means for using the first vector to project the coded signal substantially orthogonal to the interference to decrease the interference, wherein the first vector comprises a plurality of elements with each element representing a component of the interference and the means for using the first vector comprises means for generating a projection operator, wherein the projection operator comprises the form:

$$P_s^\perp = I - S(S^T S)^{-1} S^T,$$

where $P_s^\perp$ is the projection operator, I is an identity matrix, S is the matrix and $S^T$ is a transpose of the matrix.

27. The system of claim 26, further comprising means for applying the projection operator to the coded signal to substantially remove the interference from the coded signal.

28. The system of claim 26, further comprising means for applying the projection operator to a reference signal representing a code of the coded signal.

29. The system of claim 28, further comprising means for correlating a component of a received signal.

30. A method of decreasing interference in a received signal, comprising:
generating a matrix having at least one vector exclusively comprised of elements from an interfering signal;
generating a projection operator from the matrix; and
using the projection operator to substantially remove the interfering signal from the received signal.

31. The method of claim 30, wherein generating comprises:
operating on the matrix to generate the projection operator according to the form:

$$P_s^\perp = I - S(S^T S)^{-1} S^T,$$

where $P_s^\perp$ is the projection operator, I is an identity matrix, S is the matrix and $S^T$ is a transpose of the matrix.

32. The method of claim 31, further comprising applying the projection operator to the received signal.

33. The method of claim 31, further comprising applying the projection operator to a reference signal representing a code of a selected coded signal.

34. The method of claim 33, further comprising correlating a component of a received signal.

35. A system for decreasing interference in a received signal, comprising:
a matrix generator configured for generating a matrix having at least one vector exclusively comprised of elements from an interfering signal; and
a processor configured for generating a projection operator from the matrix and configured for using the projection operator to substantially remove the interfering signal from the received signal.

36. The system of claim 35, wherein the processor is further configured for operating on the matrix to generate the projection operator according to the form:

$$P_s^\perp = I - S(S^T S)^{-1} S^T,$$

where $P_s^\perp$ is the projection operator, I is an identity matrix, S is the matrix and $S^T$ is a transpose of the matrix.

37. The system of claim 36, further comprising an applicator configured for applying the projection operator to the received signal.

38. The system of claim 36, further comprising an applicator configured for applying the projection operator to a reference signal representing a code of a selected coded signal.

39. The system of claim 28, further comprising a correlator.

* * * * *